Figure 1:
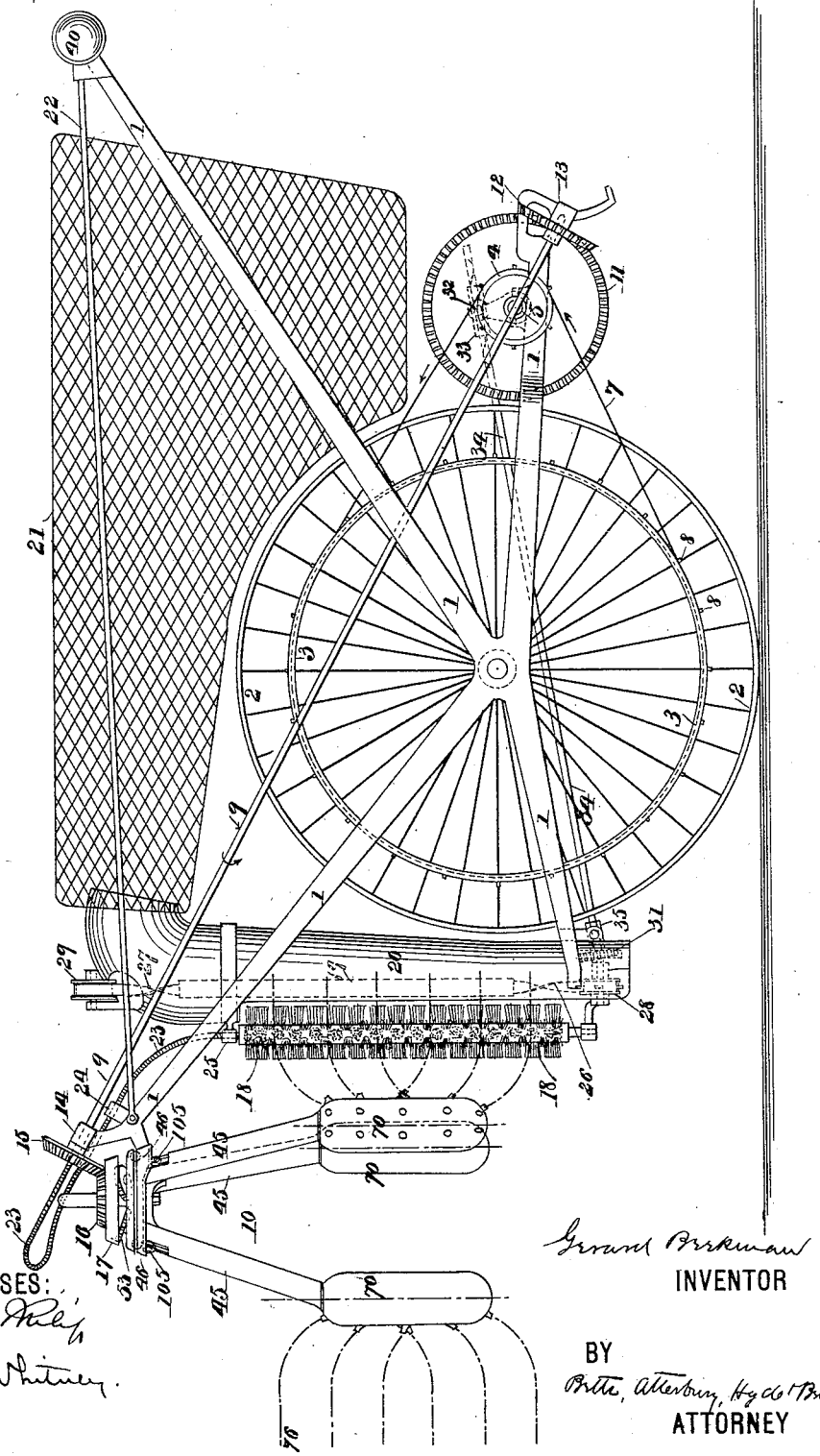

(No Model.) 7 Sheets—Sheet 1.

G. BEEKMAN.
PICKING MECHANISM FOR COTTON HARVESTERS.

No. 541,062. Patented June 18, 1895.

WITNESSES:
H. V. N. ...
W. B. Whitney.

Gerard Beekman
INVENTOR

BY
Potter, Atterbury, Hyde & Potter
ATTORNEY

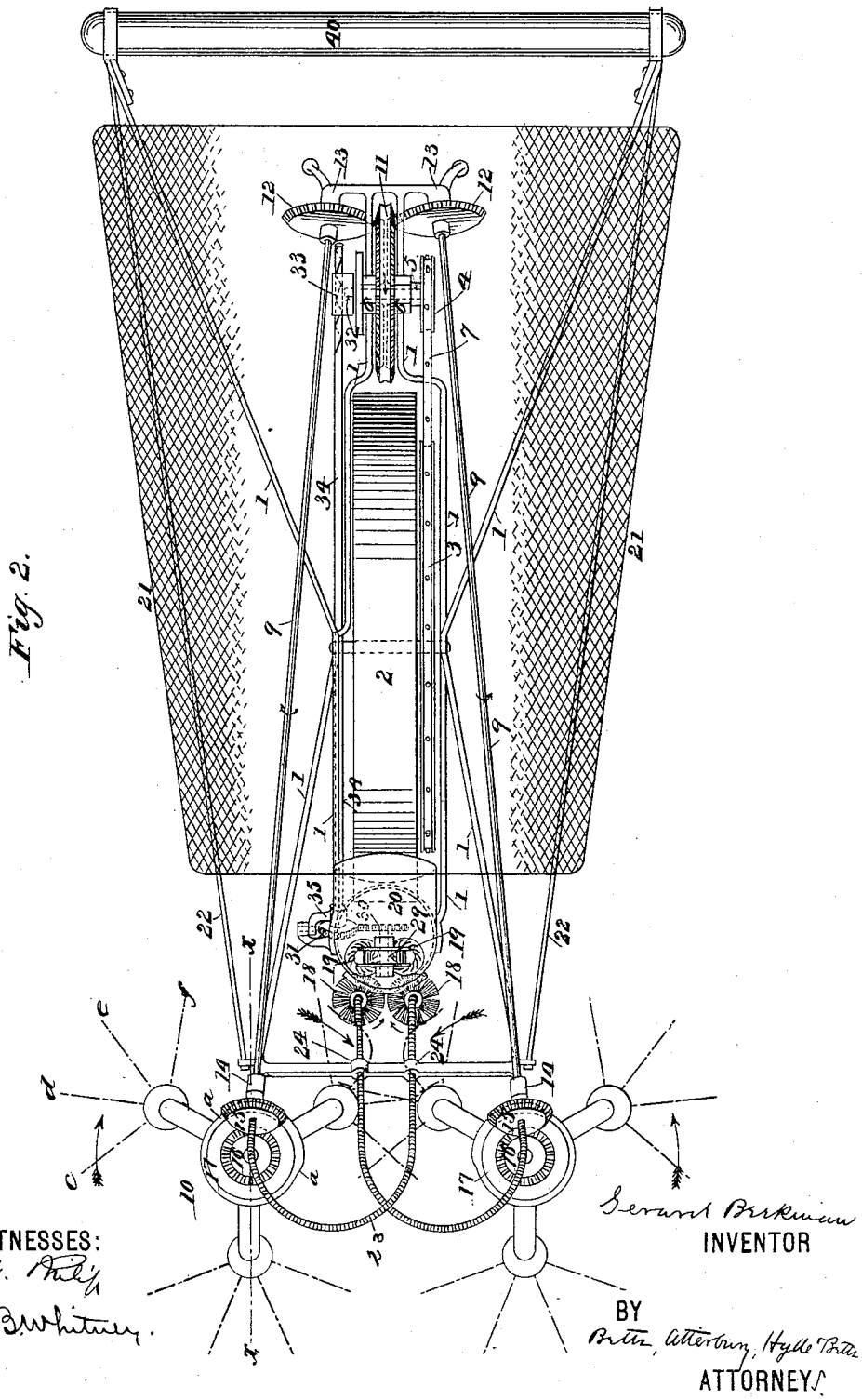

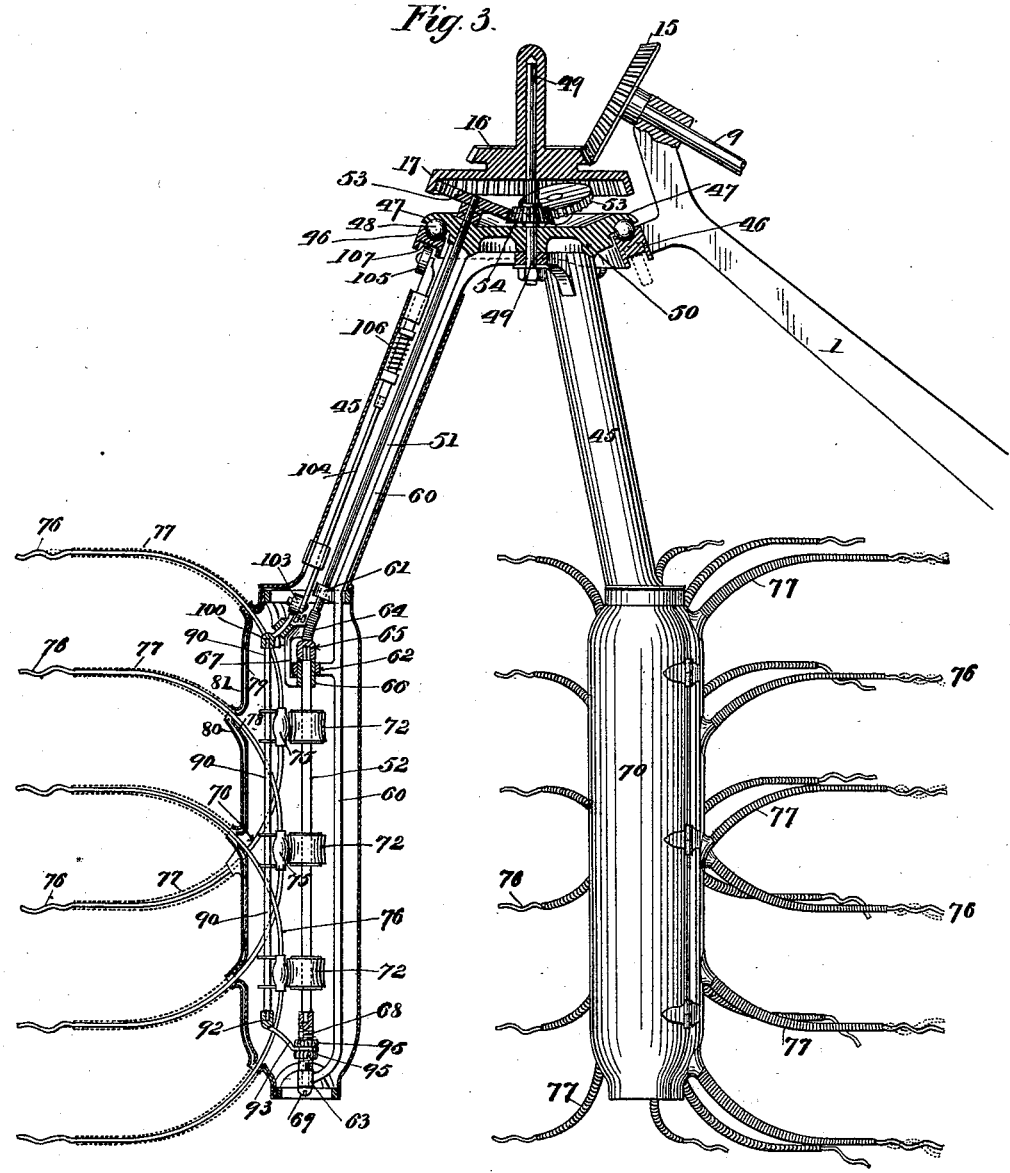

(No Model.) 7 Sheets—Sheet 4.
G. BEEKMAN.
PICKING MECHANISM FOR COTTON HARVESTERS.
No. 541,062. Patented June 18, 1895.
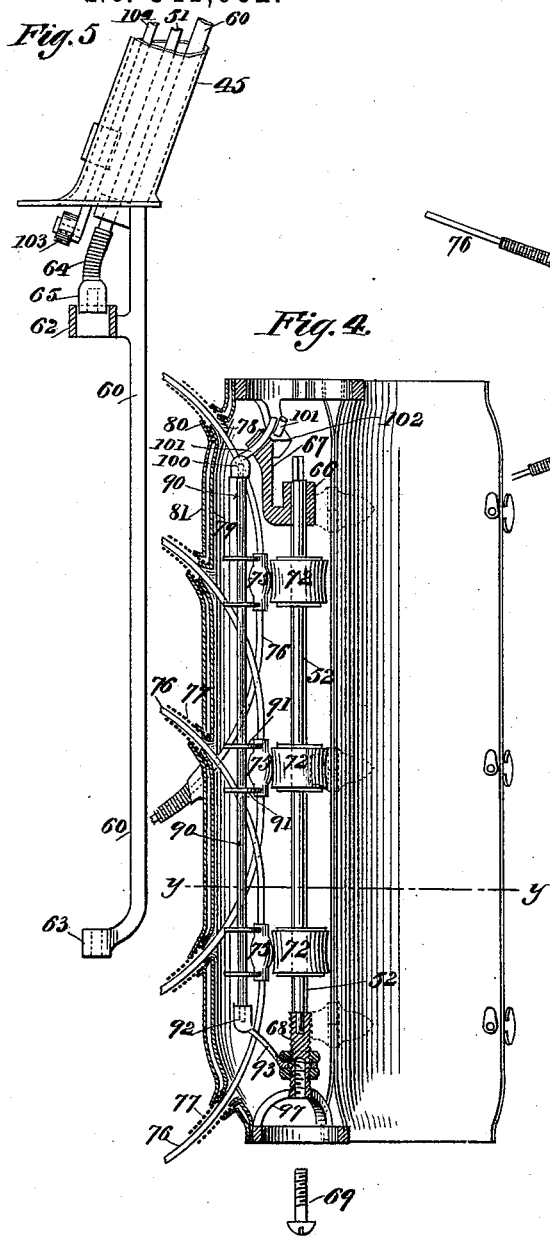
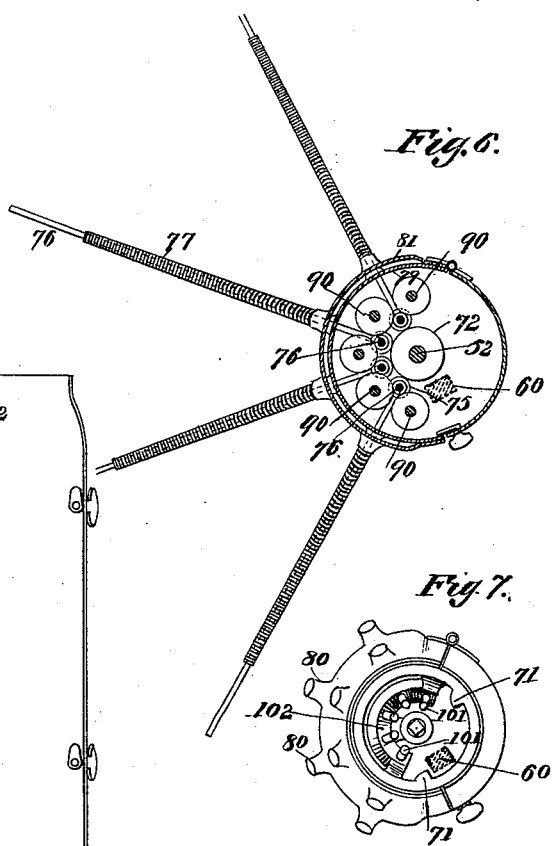
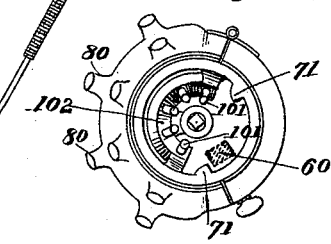
WITNESSES:
INVENTOR
BY
ATTORNEYS (No Model.) 7 Sheets—Sheet 5.
G. BEEKMAN.
PICKING MECHANISM FOR COTTON HARVESTERS.
No. 541,062. Patented June 18, 1895.

WITNESSES:

Gerard Beekman
INVENTOR

BY
Betts, Atterbury, Hyde & Betts
ATTORNEYS

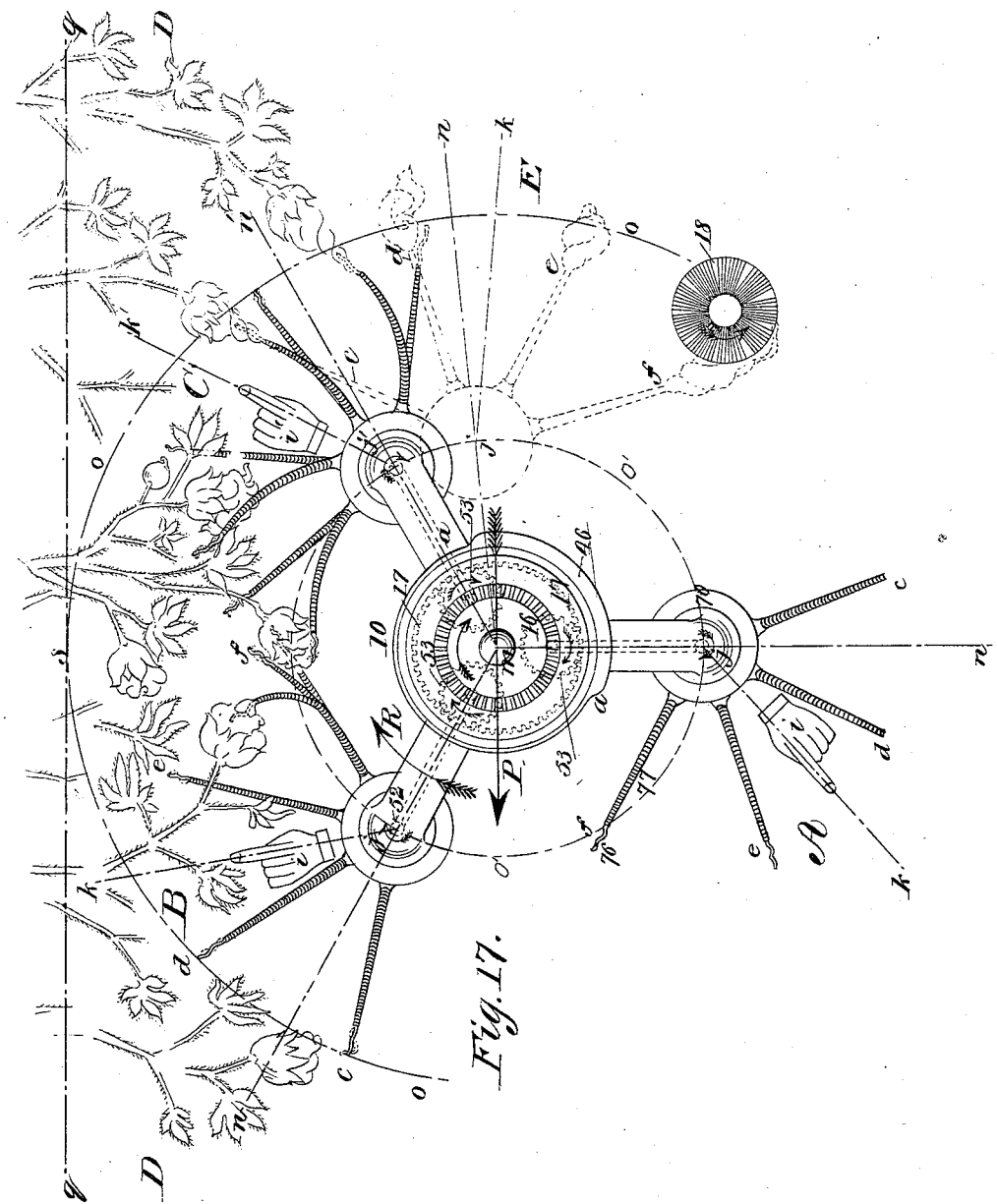

(No Model.) 7 Sheets—Sheet 7.
G. BEEKMAN.
PICKING MECHANISM FOR COTTON HARVESTERS.

No. 541,062. Patented June 18, 1895.

WITNESSES:

INVENTOR
Gerard Beekman,
BY
Betts, Atterbury, Hyde & Betts
ATTORNEYS

UNITED STATES PATENT OFFICE.

GERARD BEEKMAN, OF NEW YORK, N. Y.

PICKING MECHANISM FOR COTTON-HARVESTERS.

SPECIFICATION forming part of Letters Patent No. 541,062, dated June 18, 1895.

Application filed April 22, 1891. Serial No. 389,932. (No model.)

*To all whom it may concern:*

Be it known that I, GERARD BEEKMAN, a citizen of the United States, residing at the city and county of New York and State of New York, have invented certain new and useful Improvements in Picking Mechanism for Cotton-Harvesters, of which the following is a specification, reference being had therein to the accompanying drawings.

My invention relates to that class of cotton harvesters in which the picking mechanism is revolved backward in an orbit, in contact with the bush at substantially the same rate of speed as the motion of the harvester forward over the ground, and it further relates to improved mechanism for operating flexible or torsional pickers such as described in my Letters Patent No. 427,218.

The objects of my invention are to render the machine self-adapting to the variable structure of the plant; to adapt the structure of the machine so that it shall conflict as little as possible with the branches in traveling; and to advance and retract the pickers among the plants in such a manner that the pickers may remain in contact with the cotton a sufficient length of time when engaged but when disengaged, may sweep through the bush in search of cotton to seize upon.

The object of my invention is also to generally improve the structure of the machine, and more especially in the following particulars: to multiply the number of picking strands or pickers as proportioned to the number of driving rollers, and to automatically control the rotation of the pickers.

To these ends my invention consists of the various instrumentalities or their equivalents, herein illustrated and described, and subsequently pointed out in the appended claims.

Certain features of the subject matter herein shown and described, but not claimed, are separately described and claimed in my separate patent applications, Serial Nos. 389,931 and 389,933, filed simultaneously herewith.

In the accompanying drawings, forming a part of this specification, similar characters of reference indicate corresponding parts throughout the several views.

Figure 8:
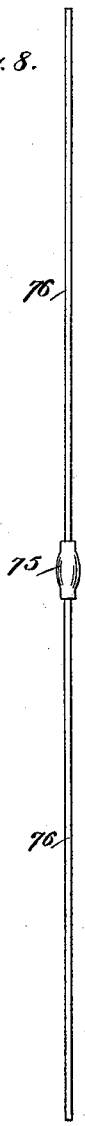
Figure 9:
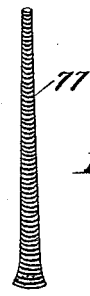
Figures 10, 12:
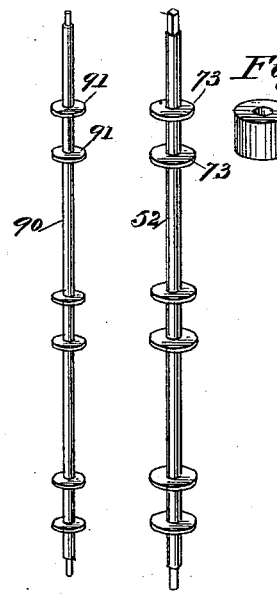
Figure 14:
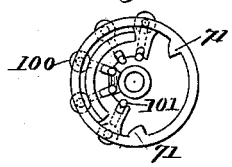
Figure 13:
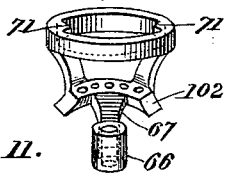
Figure 15:
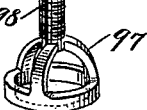
Figure 18:
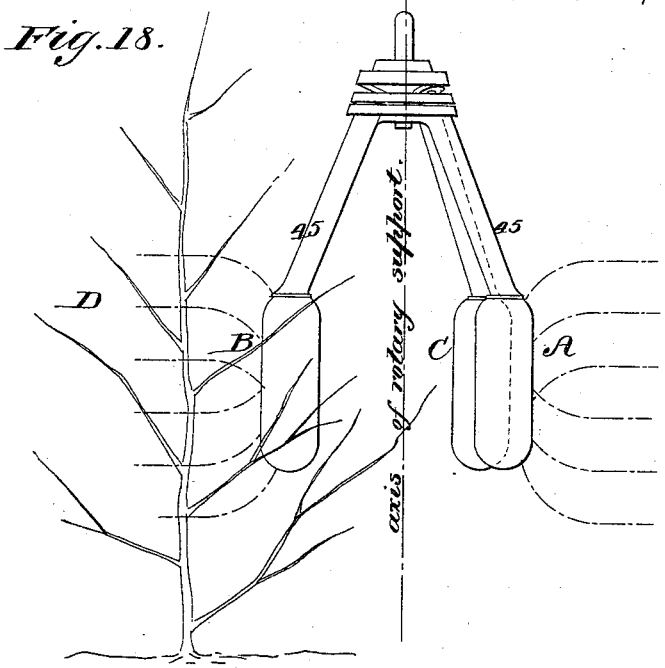

Figure 1 is a general side elevation of one suitable form of machine with which the improved picker mechanism is incorporated. Fig. 2 is a plan view of Fig. 1. Fig. 3 is an enlarged detail view of two members of one of the two groups of picking mechanism, taken in vertical section on the line $x\,x$, Fig. 2. Fig. 4 is an enlarged sectional view of a picker-case detached from its support and showing the lid partially open. Fig. 5 is a detail view of the lower extremity of the supporting-leg from which the case in Fig. 4 is detached. Fig. 6 is a horizontal sectional view of Fig. 4, taken on the line $y\,y$, and Fig. 7 a plan view of Fig. 4, said Figs. 6 and 7 showing the hinged lid closed. Fig. 8 is a detail view of the rotary thongs of leather or other flexible material composing the pickers and showing the driving-bobbin thereof. Fig. 9 is a detail view of one of the flexible picker-tubes of coiled wire for supporting and guiding the picker. Fig. 10 is a perspective view of the driving-shaft within the picker-case, and Fig. 11 a view of one of the rolls separated from the driving-shaft. Fig. 12 is a perspective view of one of the idle-spindles. Fig. 13 is a perspective view of the upper ring of the picker-case and bearings thereon, and Fig. 14 a plan view of Fig. 13. Fig. 15 is a perspective view of the lower ring of the picker-case, and Fig. 16 a similar view of the supports for the idle-spindles. Fig. 17 is a plan view of one of the groups of picking mechanisms, drawn on the same scale as Fig. 3. Fig. 18 is a diagram indicating a plant in vertical cross-section of the row and illustrating the adaptability of the machine to the character of the branches, and Fig. 19 a diagram showing a plan view of a portion of two adjacent rows and illustrating the operation of the rotary picker-frames therein.

Referring now to Figs. 1 and 2, which illustrate a hand machine, 1, is the main supporting frame; 2, the traction wheel; 3, the sprocket driving wheel, attached to the wheel 2; 4, the sprocket driven wheel, the shaft 5, of which is journaled in bearings 6, 6, upon the rear part of the frame 1, and to which wheel 4, motion is imparted from the wheel 3, by means of a band 7, having perforations into which the pins 8, of the respective wheels enter.

9, 9, are the transmitting shafts for driving the two groups of picking mechanism, 10, 10, one upon each side of the machine. These shafts 9, are driven from the shaft 5, by means of bevel gearing, consisting in a double faced gear 11, and the gears 12, 12, upon the respective shafts. The shafts 9, have bearings 13, 14, in the lower and upper portions respectively of the frame 1, and the upper extremity of said shafts bear bevel gears 15, engaging with the bevel gears 16, of the circular racks, 17, that propel the two groups of picking mechanism.

18, 18, represent the rotary cleaning brushes which remove the cotton from the picker thongs; and 19, 19, the spirally reciprocating actuators of the transmitters.

20, is the case through which the cotton is transmitted by the actuators 19, into the basket 21, placed over the wheel and resting upon the upper rods 22 of the frame 1.

The brushes 18, are driven in continuous rotation in the direction indicated by arrows, by means of flexible shafts 23, guided by bearings 24, 25 and connected with the rotary shafts 9, 9.

The actuators 19, consist of rollers having barbs projecting in the direction of transmission, in this case, upward, as more fully illustrated in a separate application, Serial No. 389,933, filed simultaneously herewith; and these barbs have contact with or are very near, the brushes 18, to catch the cotton. A spiral reciprocating motion is imparted by means of twisted flexible bands 26, 27, of metal or other suitable material connected at either end to the extremities of the rollers, and extended taut over the driving sheave 28, beneath, and the idle sheave, 29, above. The driving sheave, 28, bears sprocket teeth which enter perforations in the lower bands 26, insuring positive motion. The driving sheave common to both actuators 19, bears a spur gear 30, driven by a spur gear 31, which has an oscillatory motion, rotating in one direction and then the other, so as to impart the necessary reciprocating movement to the actuators. The oscillatory motion of the spur gear 31, is imparted by a crank 32, upon a shaft 5, at the rear end of the machine, through the means of a block 33, upon a crank pin, said block being spirally threaded to the shaft 34 of said oscillating gear. The bearing 35, of the shaft 34, is swiveled, to permit vertical vibratory motion of said shaft, due to the motion of the crank and while the shaft 34 does not have endwise motion, its alternate rotary motion is necessarily imparted by the reciprocation of the crank block, 33, upon the spiral groove or thread thereon.

The machine thus generally organized is propelled by the handle bar 40, and balanced by the operator upon the main traction wheel 2, between the rows of cotton plants, while the groups of picking mechanism 10, operate upon the adjacent side of each row of plants between which the machine passes.

As indicated by arrows, a retrogressive direction of rotation is imparted to the picker rack wheel 17, on the side thereof next the rows of plants; this rotation being more rapid than the revolution of the picker frames 50, when the machine is picking. When the machine is not picking, the picker frame 50, will revolve with the rack wheels 17, at the same speed thereof, the pickers themselves being idle. Orbital rotation is thereby imparted to the depending arms 45, bearing the picker cases, by the resistance of the gearing therein. When the arms 45, encounter the plants, and retard the revolution of the frame 50, rotation is imparted to the pickers or picker thongs themselves, through mechanism which I will now proceed to describe, referring to Figs. 3 to 16, inclusive.

46 is a stationary supporting ring attached to the frame 1. Upon this ring, the flange 47, of the rotary picker frame 50, rests and rotates freely by means of ball bearings 48. The central spindle 49, is projected from the picker frame 50, upward, and supports the driving wheel 17, rotative loosely thereon and driven by gears 15, and 16, as hereinbefore described.

51, 52, are respective sections of the driving shaft pertaining to each picker case or set of pickers; and upon the upper end of each shaft 51, there is a spur gear, 53, engaging with the interior circular rack of the driving wheel, 17. The central gear 54, loose upon the spindle 49, is interposed between the wheels 53, to support the same in gear with the driving wheel, and to equalize the strain.

As will be seen, the rotation of the driving wheel, 17, would, if the orbital motion of the picker frame 50, were unopposed, tend to simply rotate the same upon the ball bearings 48, without rotating the shafts 51, 52; that is to say, if the frictional resistance of said ball bearings were much less than that of the system of pickers. When the orbital rotation of the picker frame is opposed by the contact of the pickers with the cotton plants, the continuing rotation of the driving wheel 17, necessarily rotates the gears 53, upon their own axes, thus turning the shafts 51, 52, and actuating the pickers.

The several picker-cases and driving mechanism for the pickers are constructed as follows: Rods 60, depend from the picker frame 50, through each arm 45, of the tripod, and each of said rods has bearings 61, 62, and 63, for the shaft sections 51, 52, as in Fig. 3. The shaft 51, is connected with the shaft 52, through the flexible wrist 64, of coiled wire or other suitable form of universal joint. The flexible wrist 64, bears a head 65, having a squared socket fitting the squared upper end of the shaft 52, rendering the joint separable. The upper end of the shaft 52, is journaled in an interior bushing or bearing 66, fitting the bearing 62, of the supporting rod 60, detachable therefrom, and supported by the depending arm 67, within the picker case. The lower journal or step bearing 68, of the shaft 52 is supported within the lower portion of the case. This affords also a seat whereby the entire weight of the case rests upon the bearing 63, of the supporting rod 60, connected in place by a screw 69. Shown detached in Fig. 4. By removal of the said screw, the entire picker case and the shaft 52 and all mechanical parts therein may be separated from the supporting rod 60, and shaft 51, as indicated in Figs. 4 and 5. The picker case when in place being thus supported upon the axis of the shaft 52, is free to oscillate on its vertical axis to a limited extent for purposes which will hereinafter appear. Said oscillation is limited by means of suitable stops 71, in the upper ring of the case, as seen in Fig. 7, which touch the rod 60, when the limit is reached.

The shaft 52, bears driving rollers 72, having axes common with that of shaft 52, and having yielding surfaces of rubber or other suitable material. The cylindric piece of rubber used, shown in Fig. 11, is interposed between the disks 73, (see Fig. 10) which hold it rigid in place; or these rollers, 72, may be simply enlargements of the shaft 52. The yielding surface of the rollers 72, promotes their adherence to the rollers or bobbins 75, with which they engage by frictional contact. These bobbins are preferably made with a convex surface though I do not limit myself to this form.

76, are the flexible pickers which are projected in convenient curvatures from the ends of each of the respective bobbins 75, through the case, extending to a multiplicity of points, to insure searching all parts of the cotton plant; the axis of each bobbin 75, forming the axis of rotation of two pickers. Of course only one picker might be attached to each roller, but this would reduce the efficiency of the machine one half. The outer ends of the pickers 76, are supported in normal positions by means of the flexible tubes 77, of coiled steel wire that are seated in the case 70, as more clearly shown in Fig. 4. The expanded base of each flexible tube, 77, fits an interior nipple 78, upon an interior shell, 79, of the case 70, and an exterior nipple 80, upon an exterior shell 81, of the case 70. The exterior form of these inner and outer shells bearing the supporting nipples, may be understood by an inspection of Fig. 7.

90, are idle spindles, the flanges 91, of which bear on the bobbins 75, and guide and support the same in frictional contact with the driving rollers, 72.

As seen in plan view in Fig. 6, the number of idle spindles 90, are sufficient to include all the bobbins 75, and support them, respectively between three points; two thereof upon the peripheries of adjacent disks 91, and one upon the driving rollers 72. Thus, as long as pressure of the idle spindles 90, is maintained toward the driving shaft 52, the bobbins 75, and their two pickers each are driven; but on release of such pressure, the motion ceases.

Figure 16:
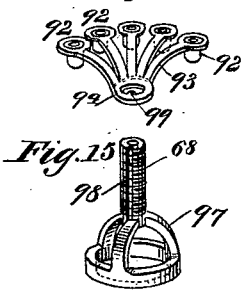

I provide a means of applying or releasing the pressure of the idle spindles 90, automatically, and throwing the pickers out of gear at the portion of the orbit of rotation of each picker case, opposite the cleaning brushes 18, so that while the pickers 76, are in contact with the said brushes they may be stationary in order to permit the removal of the cotton twisted thereon by the act of picking. Such automatic mechanism consists as follows: The lower ends of the idle spindles 90, rest in bearings 92, that are supported by flexible springs 93, as seen in Figs. 3, 4, and 16; said springs being projected obliquely from their seat. The seat 94 of the said springs comprises a collar which is interposed and supported between nuts 95, 95, upon the screw threaded stem 68, supporting the driving shaft 52, and attached to the bottom of the picker case by arms 97. The springs 93 are prevented from rotating out of alignment by means of a groove or key ways, 98, into which the projection 99, of the spring seat fits. The upper ends of the idle spindles 90 are supported in movable bearings 100, that have shanks 101 (see Figs. 3, 4, and 14) movable endwise, in the frame 102, of the upper part of the picker case. The upper ends of the shanks 101, of the series of idle spindle journals, are thus exposed, and when depressed will, owing to their oblique position and the oblique position of the springs 93, produce a radial outward motion of any idle spindle 90, thus acted upon. In order to effect the said pressure, I provide a roller 103, borne on a rod 104, extending through the leg 45 of the rotary picker frame; the upper end of said rod bearing another roller 105, that is upwardly pressed by means of the spring 106, and rides on the inverted cam-shaped surface of the groove 107. This cam, 107, has a retired surface upon the major part of its circumference, and a prominent surface upon the remaining part, divided at points $a, a$, as indicated in Fig. 2. The prominent surface of this stationary cam is upon the side thereof nearest the cleaning brush 18, so that when any picker case arrives at the portion of its orbit corresponding thereto, the roller 105, will be depressed carrying with it the rod 104, the roller 103, and one or more of the idle spindles 90, disengaging the corresponding pickers 76, from rotary motion. The picker case, being partially rotative upon its vertical axis as hereinbefore described, is adapted so that any portion of the system of pickers 76, occupying a common vertical line, or nearly so, opposite the cleaning brush, and retarded by contact therewith against motion about the vertical axis of the picker-case, will cause the idle spindles 90, pertaining thereto, to be released from the bobbins by reason of vertical coincidence with the position of the roller 103, while depressed, thus causing the disengagement of those pickers touching the brush. Moreover, while the pickers in contact with the cleaning brush are temporarily arrested, the remaining ones are permitted to continue their motion, and prevent possible dropping of the cotton which has been previously picked and wound thereon.

The operation of the machine is illustrated in Fig. 17, which represents one of the groups of picking mechanism, 10, carrying the picker cases or sets of pickers A, B, C.

The arrow P, indicates the direction of progress of the machine.

The arrow R, indicates the direction of rotation of the picker case.

The sets of pickers or picker cases, A, B, C, in their normal position, face the direction of orbital rotation in the path o—that is to say, the central line of the radiation, j. k., of each set is disposed at an angle, k. j. n., to the radius, n. m., of the circle o', in the direction of advancement as designated by the index hands, i, i. This normal position of the pickers is maintained by a yielding agency, consisting in the frictional engagement of the shafts 52, (indicated by dotted lines) with the mechanism in each picker case; said shafts receiving their rotation in the direction indicated by arrows, through the arrangement of gearing 17, and 53, before described. The pickers 76 are thus inserted endwise among the branches of the plants as they approach the same from the position A to the position B: and while the group of picking mechanism progresses in the direction of the arrow P. The flexible picker tubes 77, thereby accommodate themselves to the irregularities of the branches, and the access of the rotary thongs 76, to the bush, as the picker cases are carried from the position B, to the position C, is insured. It will be seen that, in passing from said position B to C, the pickers reach the innermost part of the bush, while at the portion s, of their orbit o, they are designed to reach or over-reach the center line q, q, of the row of plants. The angular position of the sets of pickers being maintained by a yielding agency, will permit them to turn backward as the branches may require, without breaking the same. The yielding character of the means for directing the groups of pickers toward the direction of rotation, possesses the advantage that, should the flexible tubes, 77, supporting the pickers encounter the branches of the plant, especially at the more rigid base of said tubes, the picker case bearing the entire group of pickers will yield as may be necessary, in order to avoid such conflict as would either oppose the operation of the machine or mutilate the branches. As the bushes are passed, the pickers then trail out from them as at C, by reason of their contact with the branches having caused the picker case 70, to be turned on its axis in the direction opposed by the frictional tendency of the shaft 52; thus changing the angle of the central line of radiation j, k, of that group C, to the position indicated by the index hand i, on the reverse side k', j', n' of the line m, n, to that shown in the positions A and B. After leaving the bush, the group of pickers C, then turn toward their normal angular position, until the cleaning brush 18, is reached, as indicated in dotted lines at E. The retardation of the pickers about their axes 52 is then again effected in the same manner as when passing through the bush, allowing each vertical set c, d, e, f, of thongs 76 to remain in contact with the brush long enough to insure the withdrawal of the cotton; while after such withdrawal from each said set, succeeding sets are quickly brought into position against the brush, assisted by the tendency of the group to oscillate forward. The thongs 76, being arrested in their spinning motion while in contact with the cleaning brush 18, by means of the cam 46, as before described, the release of the cotton is permitted. After passing the brush, the pickers resume their normal position as above described.

Figure 19:
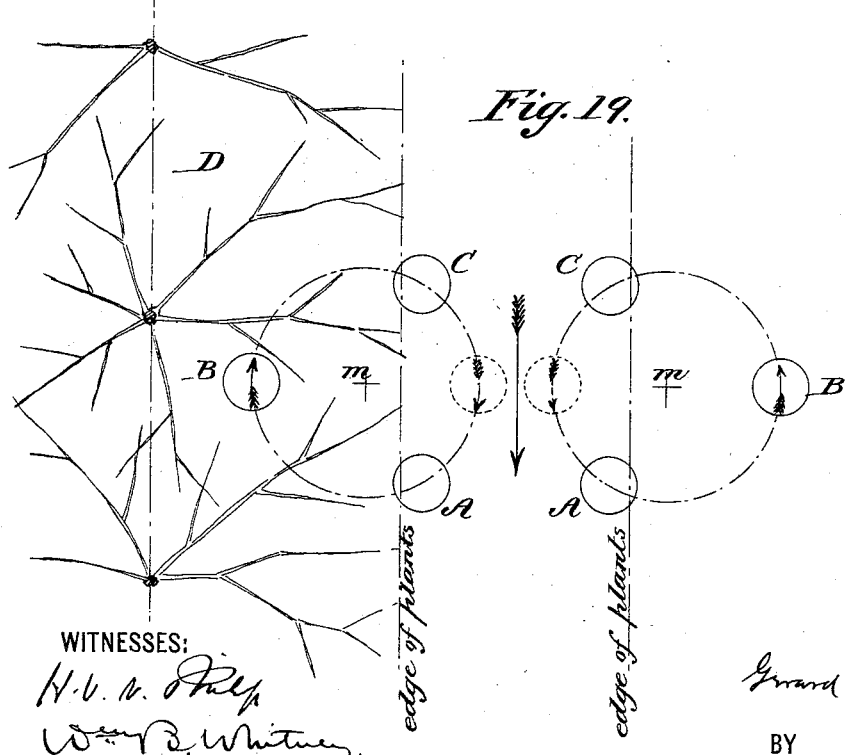

Referring to Figs. 18, and 19, it will be seen that the arms 45, owing to their angular position, are adapted for insertion between the branches of the plant which project upward at a corresponding angular position. As seen in Fig. 18, the lower branches offer greater incumbrance than the upper branches, owing to the general cone-form of the plant. The arms 45, depending angularly from the support above, and offering a construction free from any solid center beneath in the rotary frame of picking mechanism, thus avoid interference with these lower branches.

As seen in Fig. 19, the group of pickers B, is in the position of retrograde motion among the branches of the plant, while the groups A and C, are advancing forward at substantially twice the speed of the machine over the ground, and at a sufficient distance from the center of the row to clear the extremity of the branches. In the absence of a solid center at m, in the lower portion of the picker frame, it will thus be seen that the latter will clear the branches except that portion doing the picking. Moreover, the picker arm 45, being dependent for its rotation upon the resistance of the gearing for driving the pickers, will adapt its rate of revolution to the varying character of the branches along the row of plants. The groups of pickers A, B, C, also depending for their tangentially advanced position, as described with reference to Fig. 17, upon the resistance of the gearing, will adapt themselves in turn to yield and prolong the period of contact of any picker with the cotton in the boll, as may be required to extract it, but when not so required may sweep through the bush in search of cotton to seize upon.

In the structure presented, it will be seen that the rotary support, 50, functionally resembles a shoulder; the arms 45, depending therefrom moving about the axis 49, (or m, in Figs. 17, 18, and 19,) reaching into the branches of the plant; while the subordinate supports 70, having their independent oscillatory motion about their axes 52, (j, in Figs. 17, 18, and 19,) resemble functionally hands, having their limited wrist motion, and each bearing a group of fingers in the form of picking stems 76 76.

I have shown three picker cases in each of the two groups of picking mechanism, but I do not limit myself to this number; nor do I limit myself to two groups of picking mechanism operating upon the adjacent sides of adjoining rows of plants, for the machine may be constructed with groups of picking mechanism adapted to operate upon both sides of a single row of plants or upon both sides of a row and the adjacent sides of the adjoining rows; and, also, the machine may be constructed with following groups of picking mechanism at the rear adapted to glean after the groups of picking mechanism at the front of the machine.

I have shown two pickers rotated upon the axes of the rollers 75, while in former machines a separate rotating axis has been provided for each picker.

What I claim, and desire to secure by Letters Patent, is—

1. In a machine for harvesting cotton, picking devices consisting of a flexible stem having both ends free and provided with a bobbin thereon intermediate to its length and means of rotating said bobbin, substantially as described.

2. In a machine for harvesting cotton, the combination of a bobbin and means of rotating the same, with two flexible picking stems projecting in both directions of the axis of said bobbin, and connected therewith, substantially as described.

3. In a machine for harvesting cotton, a driving roller, and means of rotating the same, in combination with a plurality of bobbins, operated by said driving roller, and flexible picking stems projecting in both directions of the axes of said bobbin, and connected therewith, substantially as described.

4. In a machine for harvesting cotton, one or more picker-cases, each of said picker-cases having a rotation about the axis of a rotary-support, and also adapted to partially rotate about its own axis, each of said picker cases containing a driving-shaft in combination with a plurality of driving-rollers on said shaft, one or more bobbins engaging with each of said driving rollers, and flexible pickers projecting from said bobbins and revolving therewith, and means of operating the same, substantially as described.

5. In a cotton-harvesting machine, one or more picker-cases containing a driving-roller or shaft, a plurality of bobbins, bearing flexible pickers and revolving therewith, and idle spindles for holding said bobbins in contact with the said roller or shaft, and means of operating the said driving-roller or shaft, substantially as described.

6. In a machine for harvesting cotton, the combination of a main support and a subordinate oscillatory support or picker-case, with a driving roller or shaft, a plurality of bobbins bearing pickers, idle spindles for holding said bobbins in engagement with said roller or shaft, retractible bearings for said spindles arranged in an arc struck from the center of oscillation of said subordinate support, and an encountering roller or equivalent attached to said main support so as to encounter said spindle bearings and cause them to retract successively when said subordinate support is oscillated, and means of operating the same, substantially as described.

7. In a machine for harvesting cotton, the combination of a carrying frame and a rotary support with a driving roller or shaft, a plurality of bobbins bearing pickers, idle spindles for holding said bobbins in engagement with said roller or shaft, retractible bearings for said spindles, arranged in an arc struck from the center of rotation of said roller or shaft, a movable encountering device attached to said rotary support so as to encounter said spindle bearings, and cause them to retract, and a cam on said carrying frame adapted to move said encountering device into or out of its active position at given parts of the orbit of rotation about said main support, and means of operating the same, substantially as described.

8. In a machine for harvesting cotton the combination of a driving roller or shaft, with a plurality of bobbins bearing pickers, retractible idle spindles and springs for maintaining said bobbins in engagement with said roller or shaft, pressing said spindles toward said roller or shaft, and means of operating the same substantially as described.

9. In a machine for harvesting cotton, the combination of a driving roller or shaft, with a plurality of bobbins bearing pickers, and an idle spindle; said spindle having its bearing at one end on an oblique spring, 93, and at the other end on an oblique shank, 101, said spring and shank being disposed at opposite angles whereby the longitudinal motion of the shank shall cause the retraction of the spindle from the bobbin, or the return thereof by the re-action of said spring, and means of operating the same, substantially as described.

10. In a machine for harvesting cotton, the combination of a rotary-support and arms thereon bearing pickers, said arms projecting downward and outward from the rotary support, and then downward in a substantially perpendicular direction, so as to form a salient angle, and means for operating the same, substantially as and for the purposes described.

11. In a machine for harvesting cotton, the combination of a rotary-support above the plant and depending arms bearing pickers, said arms extending downward and outward from the rotary-support, and then downward in a substantially perpendicular direction, so as to form a salient angle, with means of rotating said support and its arms (in contact with the plants) backward at substantially the same speed as the motion of the harvester forward over the ground, the remaining arms giving clearance to the said plants, and means for operating said pickers, substantially as described.

12. In a machine for harvesting cotton, the combination of a rotary support, and depending arms thereon bearing pickers; said arms diverging downward and outward from said rotary support with means of operating the same, substantially as described.

13. In a machine for harvesting cotton, the combination of a rotary-support, depending-arms thereon, and picker cases or supports at the extremities of said arms bearing pickers, each of said picker cases having a rotation about the axis of said rotary-support, and also adapted to partially rotate about its own axis, with means of operating the same, substantially as described.

14. In a cotton harvesting machine, the combination of driving roller 72, bobbin 75, bearing pickers 76 and idle spindles 90, which in conjunction with the said driving roller support the said bobbin between three circumferential bearing points, with means of operating the same, substantially as described.

15. In a machine for harvesting cotton the combination of driving roller 72, pickers 6, bobbin 75, having an expanded central body and reduced ends, and idle spindles 90, provided with flanges 91, bearing on the said reduced ends of the bobbin, supporting said expanded portion in contact with said driving roller, and preventing longitudinal displacement thereof, with means of operating the same, substantially as described.

16. In a machine for harvesting cotton, the combination of supporting arm 45, bracket 60, driving shaft 51, separable support 70, a plurality of pickers thereon, shaft 52, and mechanism in the separable support for rotating all said pickers therefrom in common; said shaft 52, being connective to the shaft 51, when the said separable support is attached, with means of operating the same, substantially as described.

17. In a machine for harvesting cotton the combination of supporting arm 45, bracket 60, driving shaft 51, separable oscillatory support 70, a plurality of pickers thereon, shaft 52, connective to the shaft 51, and mechanism for imparting rotation therefrom to the pickers; the said support 70, having its bearing in the bracket 60, on an axis of oscillation substantially coincident with the axis of said shaft, 52, with means of operating the same, substantially as described.

18. In a machine for harvesting cotton, the combination of rotary support and means for rotating the same, with picker arms depending from said support and secured thereto upon frictional bearings adapted to revolve said picker arms in an orbit, at a slower rate of speed than the gearing imparting motion to said arms, when the picker arms are in contact with and momentarily held by the plants or the cleaning device, but at the same rate of speed at other times, substantially as described.

In testimony whereof I affix my signature, in presence of two witnesses, this 20th day of April, 1891.

GERARD BEEKMAN.

Witnesses:
H. V. N. PHILIP,
WM. B. WHITNEY.